United States Patent Office 2,976,445
Patented Mar. 21, 1961

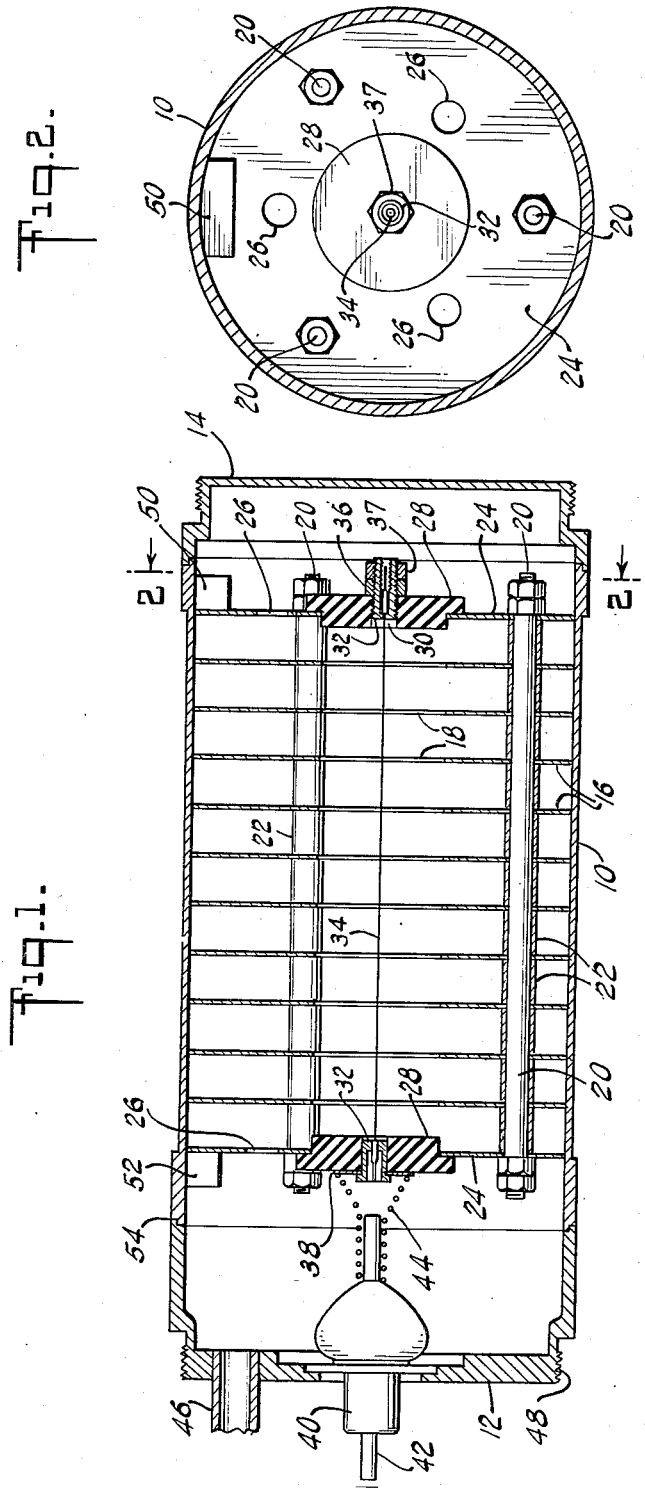

2,976,445

RADIATION DETECTOR

Roy P. Mazzagatti, Bellaire, Tex., assignor to Texaco Inc., a corporation of Delaware Continuation of application Ser. No. 439,083, June 24, 1954. This application Dec. 15, 1958, Ser. No. 780,621

13 Claims. (Cl. 313—93)

This invention relates to detectors of penetrative radiation and more particularly to detectors of the counter or gas amplification, electrical pulse-producing type. The principal object of the invention is the provision of a detector of this kind which will be stable and efficient in operation, particularly under conditions of high temperature.

In the U.S. Letters Patent No. 2,397,071, granted March 19, 1946, to D. G. C. Hare, a radiation detector of the counter type is disclosed in which a cathode and an anode are disposed within a sealed housing containing an ionizable gaseous filling. In the detector disclosed in that patent, the cathode is formed of a plurality of parallel, spaced, thin metallic plates, provided with one or more series of aligned holes, an anode wire being disposed along the longitudinal axis of each series of holes. This detector has been found to be five to ten times as efficient as a conventional Geiger-Mueller counter of the same volume.

In the U.S. Letters Patent No. 2,512,773, granted June 27, 1950, to Gerhard Herzog and Allen D. Garrison, there is a disclosure of a gaseous filling for radiation detectors of the gamma ray counter type, which filling consists of commercially pure argon and a small amount of anhydrous ammonia. This filling has been found to be very effective as the ionizable medium in a radiation detector of this type, and with this filling it has been found that the detector will have a substantially unlimited lifetime.

It is essential that the gaseous filling in a radiation detector of the counter type be maintained in its original condition, since any deterioration of the filling will cause the detector to operate improperly and may result in its being entirely inoperative. Particular care must be taken in the soldering or welding of the housing of such a detector in order to prevent any oxidation within the counter which oxidation might produce a subsequent deterioration of the gaseous filling. When a housing of such a detector is formed of a metal such as brass, the parts of the housing are usually placed together and sealed by means of soft solder. In this soft soldering operation it is sometimes difficult to prevent oxidation or tarnishing from taking place within the detector housing and, as stated above, this oxidation may have severe detrimental effects on the subsequent operation of the detector. Before the final gaseous filling is placed in the detector, the assembly must be very carefully out-gassed to remove any traces of any material which may subsequently cause oxidation within the detector. It has been found somewhat difficult to effectively out-gas a detector in which the detector housing has been sealed by means of soft soldering since the maximum temperature that may safely be used is not sufficiently high for proper outgassing. There are instances where it is desirable to use a radiation detector of this kind in measuring the intensity of penetrative radiation under conditions of high temperature, i.e., temperatures above 300–350° F. such as in certain methods of radioactivity well logging. It is sometimes impossible to use under these conditions a detector in which the housing has been assembled by means of soft solder since this solder may, of course, melt under temperatures of 350° F. or even lower. Another limitation is the fact that a detector should be outgassed during assembly at a temperature greater by 20° F. to 40° F. than the maximum temperature at which it may be operated during use. As the melting temperature of the solder used determines the outgassing temperature, the resulting maxium operating temperature for use becomes even lower.

In order to eliminate or minimize the troubles which may arise from the use of a radiation detector in which the housing is formed of brass or the like containing joints of soft solder and in accordance with the present invention, a radiation detector is provided in which the housing is formed of a material such as stainless steel. The parts of such a housing can be attached together by means of the inert gas welding process, and it is not necessary to use any lead or soft solder in the counter construction with the danger of solder flux contamination on the inside of the detector. Furthermore, such a detector can be outgassed at higher temperatures since there is no danger of melting the previously placed soft solder. Again, and for the same reason, the detector can be operated at higher temperatures. As will be set forth hereinafter, certain types or kinds of stainless steel are particularly well adapted for this detector housing construction. It is known that when measuring gamma rays of fairly high energy such as those which are measured in the making of a neutron-induced gamma ray log of a well or bore hole, where the gamma rays have energies of about 2.2 mev. and greater, it is advisable to use a cathode material of low atomic number. The reason for this choice is, of course, so that the unwanted scattered gamma radiation will not be measured with a "maximum" of sensitivity of detection as compared to the neutron-induced gamma radiation, but rather that it will be measured with only approximately an equal sensitivity of detection as the neutron-induced gamma radiation. It has been found that for such uses a detector of which both the housing and the cathode are formed of stainless steel is particularly effective.

In the construction of radiation detectors of this type, it has been common to use tungsten wires for the anodes. Tungsten is, of course, a very bad absorber of gas, and as such unless thoroughly outgassed, is very likely to contaminate the counter gas filling. This event is very likely in the case of an accidental overvoltage resulting in an arc discharge within the counter and a resulting high temperature spot on the anode wire. From this consideration stainless steel wire would be very desirable as the anode material, since its outgassing characteristics are far superior to those of tungsten wire. Furthermore, the breaking strength of stainless steel wire is not greatly inferior to that of tungsten wire.

For a better understanding of the invention, reference may be had to the accompanying drawing in which Fig. 1 is a sectional side elevation through a multicathode plate detector of the type disclosed in the aforementioned Hare patent but in which the housing of the detector is formed of stainless steel; and Fig. 2 is a sectional elevation on the line 2—2 of Fig. 1 looking in the direction of the arrows.

Referring to the drawing, a radiation detector of the counter or electrical pulse-producing type is shown, this counter comprising a casing or housing 10 usually cylindrical in shape and being provided with a pair of end closures or cap members 12 and 14. At least the housing 10 and preferably cap members 12 and 14 also are formed of stainless steel. Within the housing 10 is shown a bank of cathode plates indicated individually at 16, each of these plates having a thickness of a few mils. Each of the plates 16 is provided with one or more holes 18, one being shown in each plate of this particular detector, and the holes are arranged in series alignment. The cathode plates 16 are held together by means of a plurality of bolt members 20, a small tubular or split ring spacer 22 of stainless steel being disposed around the bolts 20 between each pair of adjacent cathode plates. These spacers 22 are of uniform length, preferalby about 3/16 of an inch and with the construction shown the bolt members 20 and the spacers 22 serve to hold the plates in uniform parallel spaced relation. As will be explained hereinafter, the plates 16 may be formed either of a high atomic number metal such as tantalum, or they may be formed of stainless steel, depending upon the use to which the detector is to be put. The end plates 24 are preferably somewhat thicker than the plates 16 and are also preferably formed of stainless steel to lend rigidity to the cathode bank. These end plates are provided with one or more small holes 26 for permitting the gaseous filling to enter and fill all of the space between the cathode plates, as will be described.

A pair of discs or plugs 28 of suitable electrically insulating material fit snugly within the holes 18 in the end plates 24, and each of these insulating discs is provided with a center hole 30 into which a small, hollow, metal cup 32 is fitted. An anode wire 34 is stretched between the cup members 32 on the longitudinal axis of the holes 18, the ends of the wire having pieces of small stainless steel tubing crimped thereon to serve as anchors in resting against the bottoms of the cups 32. The right-hand cup member 32 is shown as exteriorly threaded and provided with a nut 36 by means of which the cup can be pulled outwardly slightly so as to place some tension on the anode wire 34. A lock nut 37 can then be tightened against the nut 36. The left-hand cup 32 is enlarged at its outer end and the enlarged portion bears against a metal washer 38. The end or cap member 12 is provided with a center hole into which is fitted a suitable electric insulator 40 which may be of glass or the like and which contains a centrally disposed metal wire or rod 42. A small coil spring 44 encircles an inner end of the rod 42, making electrical contact thereto and the outer end of this spring is shown as flared to engage the washer 38. In this manner electric contact is made between the anode wire and the outer end of the connector 42 when the cap member 12 is placed in position on the housing 10. The cap 12 is also provided with a short length of soft metal tubing 46, which may be of copper and which may be connected to a suitable pump, not shown, for evacuating the interior of the housing 10 and also for pumping the gaseous filling into the housing. The caps 12 and 14 may be provided with threaded portions 48 by means of which the detector can be connected to other instruments, such as a preamplifier, a well logging electrode or instrument housing, or the like.

A small lug 50 is secured to the inner surface of one end of the housing 10, this lug being preferably formed of stainless steel and attached to the housing, as by spot welding. As will be seen from the drawing, this lug 50 serves as an abutment or stop for the end plate 24 of the detector. After assembling the anode and cathode unit, it is pushed into the housing 10 from the left-hand end until the inner end plate 24 contacts and rests against the lug 50. Another similar lug 52 of stainless steel is then placed in position against the left-hand end plate 24 and the inner surface of the housing 10 and attached thereto as by welding. The cap or closure members 12 and 14 are then placed in position against the ends of the housing 10 and welded thereto, preferably by the inert-gas process. For this welding the detector assembly may be chucked in a machine such as a lathe, and rotated slowly while the arc electrode in an atmosphere of argon is positioned opposite the exterior of the joint 54. With this welding process, there is less oxidation of the metal than with other welding processes.

In instances where it is desired to measure the intensity of gamma rays of low energy such as in the making of a scattered gamma ray log of a well or bore hole, it is desirable to use a high atomic number metal as the material for the cathode plates 16, and tantalum has been found particularly suitable for this purpose. On the other hand, when it is deired to measure the intensity of gamma rays of higher energy such as those obtained in making of an induced gamma ray well log, it is better to use a metal of lower atomic number as the cathode material, and since, as has been indicated in the foregoing, stainless steel has still other advantages when used in a radiation detector, it is particularly suited for this purpose due to its comparatively low atomic number.

While the anode wire 34 may be formed of tungsten, it is known that this metal is a bad absorber of gas and unless the metal is thoroughly outgassed, this occluded gas may subsequently contaminate the gaseous filling within the detector. For this reason it is preferred that the anode wire 34 be formed of stainless steel.

It is believed that the advantages of stainless steel for use particularly in the construction of the housing and other parts such as the cathode end plates 24, the lugs 50 and 52, etc., have been clearly set forth hereinabove. It may again be emphasized that stainless steel is particularly well suited for inert-gas welding, and it is therefore, for an all-welded detector, easy to outgas the detector under temperatures even as high as 800° F. Outgassing at high temperature is very desirable and this would, of course, be impossible with a detector in which the housing is formed of another metal such as brass, the parts of which are held together and sealed by the use of solder. Again, because the detector parts can be welded rather than soldered, the detector is effective under conditions of high temperature such as in logging certain deep bore holes where the temperature may be several hundred degrees Fahrenheit.

While there are several stainless steel alloys which may be more or less suitable for radiation detector construction, it is preferred that one of the alloys be used which have been designated as numbers 302 and 304 by the American Iron and Steel Institute. These alloys contain only iron, carbon, silicon, manganese, chromium, and nickel, and are therefore well suited for inert-gas welding. Again, since the stainless steels 302 and 304 contain comparatively few elements in their alloys, there is less chance that spurious counts and a resulting high background will be produced in a detector in which these metals are used. It has been found that the stainless steel 302 is well suited for the cathode plates and other small parts which do not require much welding, and that the stainless steel 304 is very satisfactory for the housing of the detector. This latter alloy can be welded somewhat easier than the 302 due to the smaller content of carbon. The stainless steel 304 is therefore less corrodible after welding. It is also preferred to use the steel in the form of rolled stock, since this has no holes or pores as distinguished from the steel in cast form. It is also preferred to use the steel, such that any tube-like pores, formed during the process of rolling said steel, are in such a direction as not to allow gas leaks into gas filling of counter.

While a particular form of radiation detector has been described and illustrated in the drawing, it is to be understood that this has been described by way of example only, and the detetcor may be quite different from that described while still embodying the principles of the invention. Thus the detector may be in the form of a conventional Geiger-Mueller counter having a cylindrical cathode and an anode wire disposed along the longitudinal axis of the cylinder. These electrodes may be disposed within a housing of stainless steel and, as indicated above, for some purposes the cylindrical cathode and/or the anode wire may also be formed of stainless steel.

This application is a continuation of my application

Serial No. 439,083, filed June 24, 1954, and now abandoned.

Obviously, many other modifications and variations of the invention as hereinbefore set forth may be made without departing from the spirit and scope and only such limitations should be imposed as are indicated in the appended claims.

I claim:

1. A detector of penetrative radiation such as gamma rays, of the gas amplification, electrical pulse producing type for use in logging a bore hole and which is adapted to be used under conditions of high temperature comprising a welded sealed housing, and cathode and anode electrodes within said housing, said housing containing an ionizable gas and being constructed entirely of stainless steel parts which are welded together.

2. A detector as described in claim 1 in which said anode is also formed of stainless steel.

3. A detector as described in claim 1 in which said housing is formed of stainless steel No. 304.

4. A detector as described in claim 1 in which both the housing and the cathode are formed of stainless steel.

5. A detector as described in claim 4 in which the cathode is formed of stainless steel No. 302.

6. A detector as described in claim 4 in which the stainless steel is No. 304.

7. In a well logging apparatus comprising an instrument including a radiation detector adapted to be passed through a borehole, the improvement comprising a detector of penetrative radiation such as gamma rays, of the gas amplification, electrical pulse producing type for use in logging a bore hole and which is adapted to be used at temperatures exceeding 350° F. comprising a welded sealed housing, a cathode and an anode within said housing, said cathode comprising a bank of parallel spaced, thin, metallic plates, provided with at least one series of holes positioned in series alignment in said plates, and said anode consisting of a wire disposed along the longitudinal axis of said series of holes, said housing being formed entirely of stainless steel parts which are welded together, said detector being the product of outgassing the above defined assembly at a temperature in excess of 350° F. followed by introduction into said assembly of an ionizable gaseous filling.

8. A detector as described in claim 7 in which said cathode is also formed of stainless steel.

9. A detector as described in claim 8 in which said cathode is formed of stainless steel No. 302.

10. A detector as described in claim 7 in which said housing is formed of stainless steel No. 304.

11. A detector of penetrative radiation such as gamma rays of the gas amplification, electrical pulse producing type for use in logging a bore hole and which is adapted to be used under conditions of high temperature comprising a sealed housing containing therein an ionizable gas and cathode and anode electrodes, said housing having an elongated tubular body portion formed of stainless steel, and end closures also formed of stainless steel and which are welded to the cylindrical body portion to form the sealed housing, said detector being the product of outgassing said sealed housing at a temperature in excess of 350° F. followed by the introduction into said housing of said ionizable gas.

12. A detector as defined in claim 11 wherein the cathode comprises a plurality of substantially parallel plate-like elements formed of stainless steel and the anode comprises at least one wire like member disposed substantially transverse to the plate-like cathode elements.

13. In an apparatus for conducting a neutron-gamma log of the earth formations along the traverse of a borehole through the earth, said apparatus comprising a neutron source adapted to be passed through a borehole to bombard the surrounding earth formations with neutrons and a detector of the ionizable gas amplification pulse producing type to be passed through the borehole to detect gamma radiation emitted from the earth formation into the borehole due to said neutron bombardment, the improvement comprising said detector having a welded sealed stainless steel housing containing an ionizable gaseous filling, an anode and a stainless steel cathode assembly, whereby gamma radiation to be detected may be intercepted by the stainless steel components of the detector.

References Cited in the file of this patent

UNITED STATES PATENTS

| | | |
|---|---|---|
| 2,483,139 | Herzog | Sept. 27, 1949 |
| 2,590,108 | Liebson | Mar. 25, 1952 |
| 2,701,175 | Mazzagatti et al. | Feb. 1, 1955 |
| 2,835,839 | Borzin | May 20, 1958 |
| 2,882,117 | Bruining et al. | Apr. 14, 1959 |

OTHER REFERENCES

Diven: "Operation of Proportional Counters at Pressures Above Atmospheric," MDDC-458, Technical Information Division, Oak Ridge Directed Operations, Oak Ridge, Tenn. Pages 1, 2 and 4. Declassified October 30, 1946.